Patented June 5, 1923.

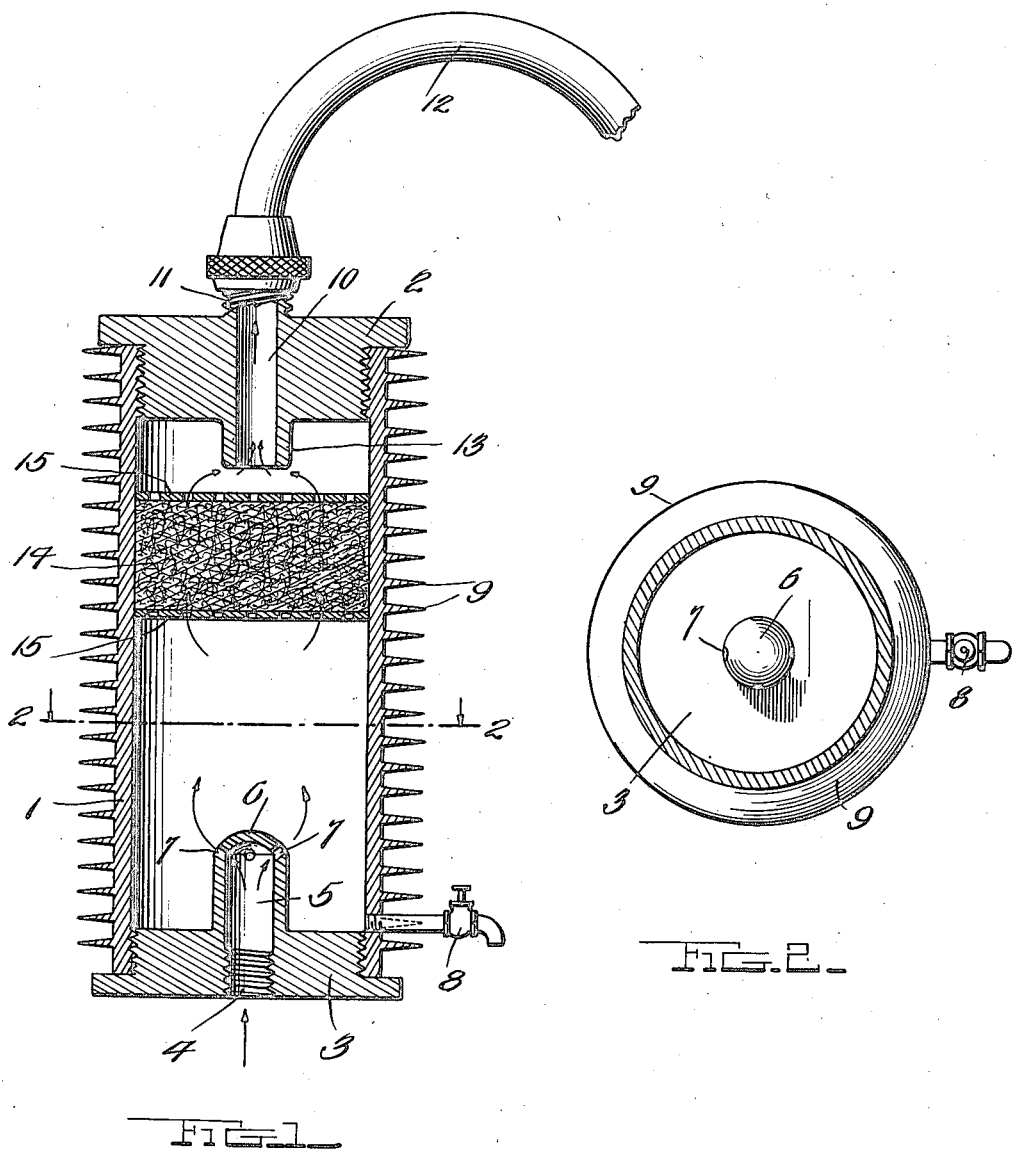

1,458,005

UNITED STATES PATENT OFFICE.

DANIEL ROHRER, OF SPOKANE, WASHINGTON.

AIR-PURIFYING DEVICE FOR MOTOR-DRIVEN TIRE PUMPS.

Application filed March 24, 1921. Serial No. 455,180.

*To all whom it may concern:*

Be it known that I, DANIEL ROHRER, a citizen of the Dominion of Canada, residing at Spokane, in the county of Spokane and State of Washington, have invented certain new and useful Improvements in Air-Purifying Devices for Motor-Driven Tire Pumps; and I do declare the following to be a full, clear, and exact description of the invention, such as will enable others skilled in the art to which it appertains to make and use the same.

My invention has for its object to provide an extremely simple yet a highly efficient and reliable device for attachment to motor driven tire pumps for the purpose of cooling and condensing the air discharged therefrom, before this air enters the tire inflation hose, the device being constructed in such a manner as to condense any oil vapor in the air discharged from the pump, so as to prevent the passage of oil into the inflation hose and the automobile tires.

With the foregoing in view, the invention resides in the novel construction and association of parts hereinafter described and claimed, the descriptive matter being supplemented by the accompanying drawings.

Figure 1 is a vertical longitudinal sectional view of a device constructed in accordance with my invention.

Figure 2 is a horizontal sectional view as indicated by line 2—2 of Fig. 1.

In the drawings above briefly described, the numeral 1 designates a vertically elongated hollow cylinder whose upper and lower end walls are here shown in the form of threaded plugs 2 and 3 respectively, although these walls might be in other forms. The lower end wall 3 is provided with a central air inlet 4 which is preferably threaded and adapted for connection with the discharge passage of a motor driven tire pump. A short vertical wall or tube 5 rises from the end wall 3 around the air inlet 4 and is closed at its upper end as indicated at 6, but is provided with air discharge perforations 7. The oil laden air from the pump enters the cylinder 1 through the inlet 4, tube 5 and the perforations 7, expands and is cooled in this manner and the oil vapor is thus condensed and settles to the bottom of the cylinder from which it may be drained from time to time through a suitable pet-cock or the like 8, the tube 5 serving to prevent the trapped oil from flowing out through the opening 4 and again mixing with the incoming air.

The air discharged into the cylinder 1 is highly heated due to its state of compression and the temperature of the pump and hence I provide the cylinder with some adequate cooling means, such as a plurality of circumferential parallel fins 9. This insures that the air shall be sufficiently cooled to cause proper condensation of the oil vapor.

The upper end wall 2 of the cylinder 1 is provided with a central air outlet opening 10 terminating in a threaded nipple 11 to which the usual inflation hose 12 is adapted for connection, and the lower side of said end wall 2 is by preference provided with a depending annular flange 13 surrounding the outlet 10, although this detail need not be followed in all instances.

The device may be successfully used when it embodies only the features so far described, but I prefer to mount a quantity of absorbent material 14 between a pair of openwork partitions 15 which extend horizontally across the interior of the cylinder. It is thus insured that no oil vapor whatever will escape through the outlet 10 since any vapor that may not condense will be absorbed by the material 14.

The device is extremely simple and inexpensive, yet is highly efficient and in every way desirable, serving to effectively cool the air before it is discharged through the inflation hose and also acting to remove the oil with which the air is usually laden when it is discharged from the pump. The entrance of oil into the tires of the machine is thus prevented with the result that the life of the tubes is greatly prolonged. This applies also to the inflation hose 12 as will be readily understood.

Since excellent results may be obtained from the exact details shown and described, such details may be followed. I wish it understood however that within the scope of the invention as claimed, the device may be embodied in other forms.

I claim:

1. An air purifying and cooling device for motor driven tire pumps, comprising a vertically elongated cylinder closed at both ends and provided between its end walls with openwork partitions extending uninterruptedly across its interior and air filtering material between said partitions, the lower end wall of said cylinder having a central air inlet port for communication with the air outlet of a motor driven tire pump, said lower end wall having an integral tube around said inlet port extending upwardly into the cylinder and provided with a perforated dome-like closure at its upper end, said tube serving to prevent return of oil through said air inlet port, the upper end wall of said cylinder being formed with a vertical air outlet port and an external nipple through which it extends, said nipple being threaded for engagement with a hose connection by means of which an inflation hose may be connected to the cylinder.

2. An air filter for disposition between a motor driven tire pump and an inflation hose, comprising a vertically elongated cylinder having both ends closed by plugs threaded therein and provided between its ends with air filtering means extending uninterruptedly across its interior, the lower end plug of said cylinder having a central air inlet port internally threaded for engagement with the air outlet nipple of the tire pump, said lower end plug being provided with an integral tube around said inlet port extending upwardly into the cylinder and provided with a perforated dome-like closure at its upper end, said dome-like closure serving to prevent direct discharge of air against the filtering means while said tube prevents return of oil through the air inlet port, the upper end plug of the cylinder being formed with a vertical air outlet port and an externally threaded nipple through which it extends, said nipple being adapted for engagement with a hose.

In testimony whereof I have hereunto set my hand.

DANIEL ROHRER.